United States Patent Office 2,897,628
Patented Aug. 4, 1959

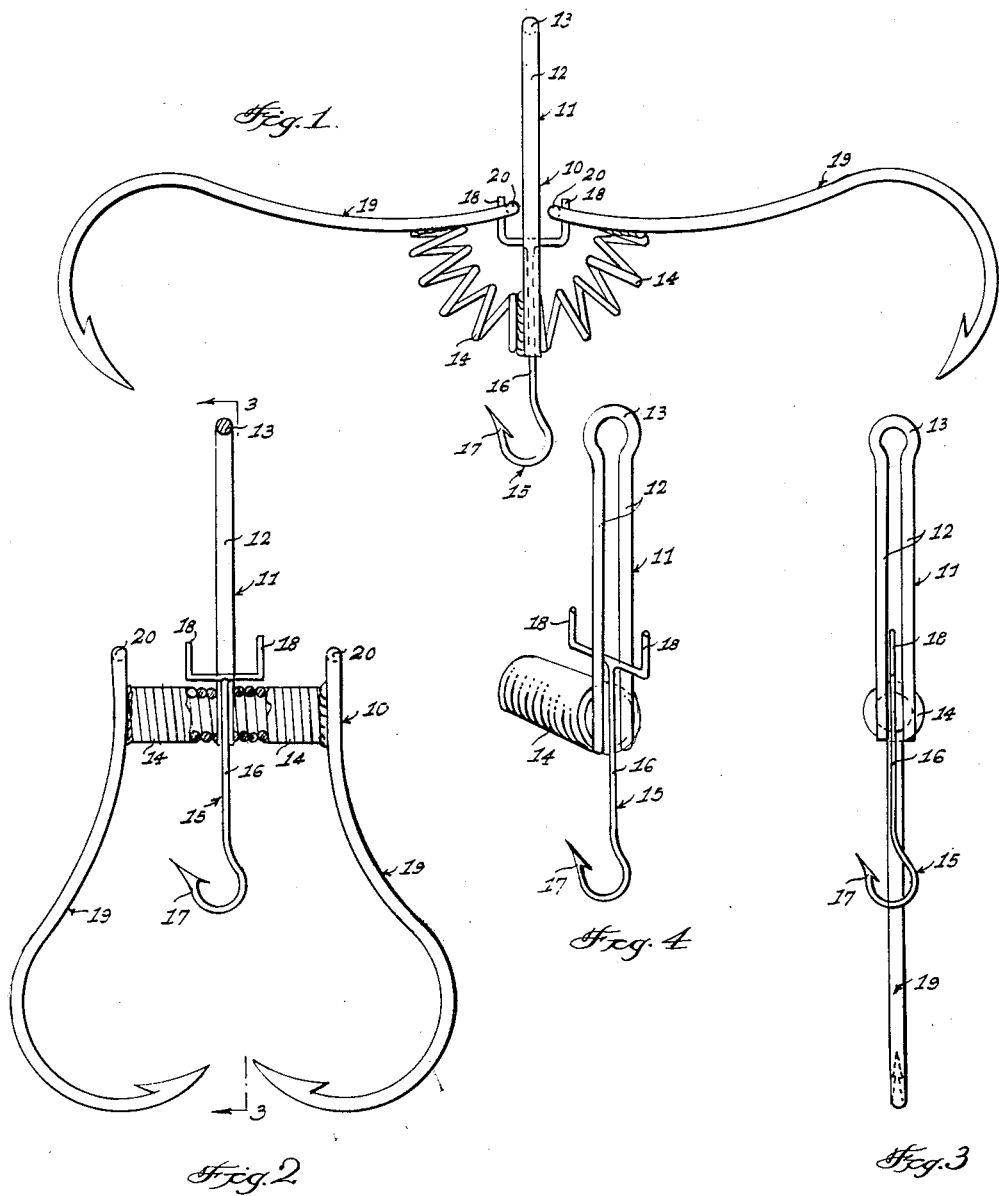

2,897,628

FISHHOOK

Milford E. Thibodeau, Scarborough, Maine

Application May 29, 1958, Serial No. 738,760

1 Claim. (Cl. 43—89)

This invention relates to a fishhook assembly, and more particularly to a fishhook assembly which is especially suitable for use by commercial fishermen.

The object of the invention is to provide a fishhook assembly which includes a trigger and a pair of holding hooks, so that with the device attached to a fishing line, and with bait on the trigger hook, when a fish attempts to take the bait, a pair of holding hooks will be actuated to cause the holding hooks to engage the head or other portion of the fish so that the fish will be firmly gripped whereby the line can be reeled in or pulled in to retrieve the fish.

Another object of the invention is to provide a fishhook assembly which can be set by the fisherman, and then placed in the water so that a fish attempting to take the bait will be snagged or gaffed by a plurality of hooks so that there will be less likelihood of the fish escaping from the device.

A further object of the invention is to provide a fishhook assembly which is extremely simple and inexpensive to manufacture.

Other objects and advantages will be apparent during the course of the following description.

In the accompanying drawings, forming a part of this application, and in which like numerals are use to designate like parts throughout the same:

Figure 1 is an elevational view showing the holding hooks open, and showing the fishhook assembly set in open position.

Figure 2 is a view similar to Figure 1, but showing the holding hooks in closed position, and with parts broken away and in section.

Figure 3 is a sectional view taken on the line 3—3 of Figure 2.

Figure 4 is a fragmentary perspective view illustrating certain constructional details of the device.

Referring in detail to the drawings, the numeral 10 indicates the fishhook assembly of the present invention, and it will be seen that the fishhook assembly includes a shank which is indicated generally by the numeral 11. The shank 11 comprises a pair of spaced apart legs 12 which are joined together at one end by a curved web 13. The web 13 is shaped to define an eye which is adapted to be connected to a fishing line.

There is further provided a pair of opposed aligned spring members 14 which are arranged in end-to-end relation with respect to each other. The spring members 14 are secured as by welding to the legs 12, Figure 2. There is further provided a movable trigger which is indicated generally by the numeral 15, and the trigger 15 includes a stem 16 which is slidably mounted between the spring members 14 and between the legs 12. The trigger 15 includes a pair of spaced parallel opposed fingers 18, and the other end of the trigger 15 is provided with a hook 17.

The numeral 19 indicates each of a pair of similar holding hooks, and the hooks 19 are secured as by welding to the outer ends of the spring members 14. Each of the hooks 19 is provided with an eye 20 on an end thereof, and the eyes 20 are adapted to selectively engage the fingers 18 of the trigger 15 as for example when the parts are in the position shown in Figure 1.

From the foregoing, it is apparent that there has been provided a fishhook assembly which is especially suitable for use by commercial fishermen. In use, bait of a suitable nature or type is adapted to be arranged on the hook 17 of the trigger 15, and the parts are adapted to be moved or arranged as shown in Figure 1. With the parts in the position of Figure 1, it will be seen that the eyes 20 of the hooks 19 will engage the fingers 18 and due to the pressure of the springs 14, the hooks 19 will be held in their open or extended position. The web 13 of the shank is adapted to be connected to a fishing line. Then, when a fish comes to take the bait on the hook 17, the trigger 15 will be pulled downwardly so that the pair of fingers 18 will move clear of or free of the eyes 20 and this will permit the pair of springs 14 to close the hooks 19 with a snap or fast action so that the parts will move from the position shown in Figure 1 to the position shown in Figure 2. As the hooks 19 snap inwardly to the position of Figure 2, the hooks 19 will engage the sides of the head of a fish nibbling on the bait, so that the fish will be securely caught or held. Then, by pulling in on the fishing line, the fish can be readily retrieved. After the fish has been retrieved, the device can be again set so that the parts can be readily moved from the position shown in Figure 2 to the position shown in Figure 1, so that the device can be used over and over again.

The parts can be made of any suitable material and in different shapes or sizes.

To set the hook, the members or holding hooks 19 can be grasped, one in each hand and then these holding hooks 19 are spread apart. Then, the trigger 15 can be pressed against a suitable object so that the forks or fingers 18 will move into the eyes 20 so as to hold the hooks 19 open.

Figure 1 illustrates the commercial fishhook in a set position. The trigger hook 17 is baited and the fishing line is adapted to be attached to the web or eye 13. When the fish takes the bait and pulls, the forked end 18 of the trigger slides out of the eyes 20 of the holding hooks 19 so as to release the springs 14 which force the holding hooks 19 to close whereby the barbs of the hooks 19 will be stuck into the head of the fish so that the fish will be firmly held.

It is to be noted that after the hook has been set, it can be triggered only by a pull on the trigger 15 and cannot be triggered by a pull on the fishing line. This permits the fisherman to move the line and hook at will without accidentally setting off the hook. If desired, the hooks 19 and springs 14 may be made as an integral unit during the manufacture thereof.

The present invention is especially suitable for use when fishing commercially, but it is to be understood that it can be used for other types of fishing purposes.

Minor changes in shape, size and rearrangement of details coming within the field of invention claimed may be resorted to in actual practice, if desired.

I claim:

In a device of the character described, a shank including a pair of spaced apart legs, a curved web joining the outer ends of said legs together, a pair of aligned spring members arranged in end-to-end relation with respect to each other and said spring members being secured to said legs, a trigger including a stem slidably mounted between said spring members and legs, a hook on one end of the stem, spaced parallel opposed fingers on the other end of said stem, a pair of holding hooks mounted for movement towards and away from each other, said holding hooks being secured to the outer ends of said spring members, said holding hooks being provided with eyes for selective engagement with said fingers.

References Cited in the file of this patent

UNITED STATES PATENTS

| | | |
|---|---|---|
| 31,396 | Morris | Feb. 12, 1861 |
| 967,897 | Gelsinger | Aug. 23, 1910 |
| 1,077,850 | Mebane | Nov. 4, 1913 |
| 1,632,566 | Schneider | June 14, 1927 |
| 1,878,635 | Katich | Sept. 20, 1932 |
| 2,534,152 | Van Arkel | Dec. 12, 1950 |